March 3, 1931.  F. W. YOUNG  1,794,433
MANUFACTURE OF FIBROUS SHEET MATERIAL
Filed Dec. 8, 1927
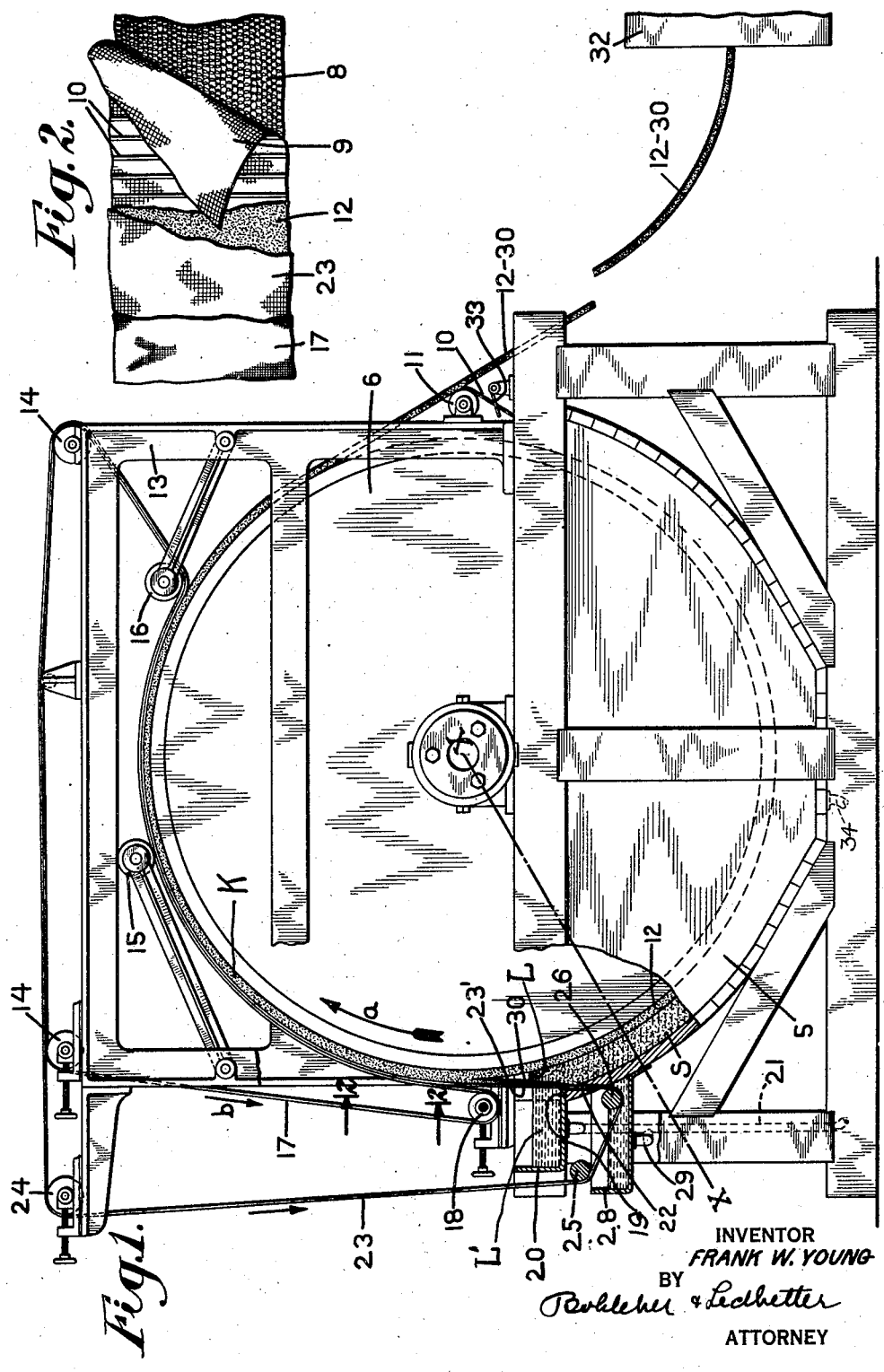
INVENTOR
FRANK W. YOUNG
BY
ATTORNEY Patented Mar. 3, 1931

1,794,433

UNITED STATES PATENT OFFICE

FRANK W. YOUNG, OF VERONA, NEW JERSEY

MANUFACTURE OF FIBROUS SHEET MATERIAL

Application filed December 8, 1927. Serial No. 238,705.

This invention relates to the continuous manufacture of wallboard, insulating board, and the like from a stock mixture containing generally fibrous material suspended in a very much larger quantity of fluid.

It is sought to effect the formation of the finished product by the removal of the fluid from the stock mixture through the instrumentality of filtration apparatus. In a copending application of Frank W. Young and Arthur Wright, Serial No. 115,481, filed June 12, 1926, there is disclosed a continuous filter wherefrom is effected a discharge of filter cake, in a continuous sheet, by means of a cake reinforcement formed of separate, spaced strands encircling the filter drum and leading therefrom to devices adapted to separate the filter cake from the spaced strand reinforcement.

In accordance with this invention, a filter and cake reinforcement of the general character illustrated in the aforesaid application is availed of, but due to the characteristics of the material from which certain insulating boards and the like are formed, the filtering apparatus of the application requires modification to produce a filter cake such that when dry a sheet of the requisite thickness is obtained.

In the following description the term "sheet" will be used to refer generally to insulating boards, wallboards and the like and is intended to denote, broadly, any sheet having uses of the same general nature.

As an example, a sheet may be considered which is formed of fibrous material doctored with dilutants which, irrespective of the percentage of solids in the slurry delivered to the filter, render the slurry difficult to filter and form a cake of such density that the suction of fluids therethrough is difficult beyond a predetermined cake thickness; thus limiting the thickness of the cake possible to build up with previously known filtration methods and which cake, when dry, results in a sheet of fibrous material altogether too thin for the purpose at hand. For instance, a pulp containing 2% solids may form a cake of such density on the filter medium that it will hold twenty-five inches (barometric pressure) on compression and yet dries to less than ¼ inch in thickness or at least 50% of the thickness required for the finished wallboard.

It has been found necessary to form a cake of substantially two to two and one-half inches in thickness on the filter medium in order that when suitably dewatered and compressed and suitably dried, the cake will have a thickness of substantially one-half inch.

In accordance with this invention, the filter cloth of a continuous rotary type filter drum is replaced by a screen of wire mesh and near the end of the filtering cycle an additional layer of filter cake or pulp is applied to or formed on the filter drum which additional layer is formed by a separate filtering step and is retained in contact with the cake on the drum throughout the dewatering and compressing zones by means of a screen of wire mesh. Preferably this screen serves as the filtering medium of the supplemental filtering device as well as cake retaining means and prevents the cake from slipping back during compression, piling up and disrupting or, as it is called in the trade, preventing the cake from being "over couched".

In order that the invention may be clearly understood and readily carried into effect the same will now be described in greater particularity in connection with the accompanying drawings illustrating one embodiment whereby the invention may be realized, and wherein:

Figure 1 is a view, in side elevation, showing a filtration apparatus in accordance with this invention for the production of a finished product in the form of a sheet.

Figure 2 is a fragmentary vertical sectional view on the line 2—2 of Figure 1.

A slurry S containing a pulp formed of fibrous material and other necessary dilutants in the proportion of, say, from two to four percent of solids is lead into a filter tank 5 within which rotates the filter drum 6 in the direction shown by the arrow $a$.

The filter drum 6 carries on its peripheral surface a spiral wire drainage member 8 and overlying this drainage member 8 is a layer 9 of wire mesh of, say 14 to the inch, which serves as the filter medium on the drum.

Contacting with this filter drum 6 is a cake reinforcement comprising spaced independent and preferably substantially parallel strands 10 which encircle the drum 6 and a cake discharge roll 11 on the discharge side of the apparatus. In the filtering zone the solid particles from the slurry S build up on the filter medium 9 and around the reinforcement 10 to form the layer of filter cake 12.

Supported from the tank 5 is the frame 13 and adapted to travel about the idler rolls 14 and compression rolls 15, 16 on the frame 13 is a compression belt 17 of fibrous material, such as woven fabric, which is adapted to compact the filter cake in the dewatering zone as will be understood.

As shown, the compression belt 17 rotates in a clockwise direction, that is, in the direction indicated by the arrow $b$, and the tank 5 is filled, say, through pipe 34, with a slurry S of the desired composition up to the level shown at L. At the left of Figure 1, that is, on the side of the drum opposite to the point of cake discharge, the compression belt 17 is brought down around an adjustable roller 18 so as to apply pressure as nearly as possible at the end of the filtering zone or the beginning of the dewatering zone.

It will be observed that the tank 5 is cut away at the left hand side, as at 19, and is formed with an overflow basin 20 into which the slurry may flow and from which it may be returned by the pipe 21 to the source of supply. The wall of the tank 5 is also formed immediately below the overflow basin 20 with a slot 22 for the passage, say, of a woven wire belt 23 of a mesh, say, of 14 to the inch. This passes upward in the space between the tank proper and the overflow basin 20 as shown at 23' and overlies the filter cake 12 built up on the drum 6 and travels immediately beneath the compression belt 17 until it leaves the peripheral surface of the drum 6 at the compression roller 16 shown at the right hand side of the figure. It returns over a supplemental adjusting roller 24 carried at the top of the frame 13, at the left, and under idler rollers 25, 26 beneath the overflow basin 20, the idler roller 26 serving to direct the wire mesh belt 23 into the slot 22 in the wall of the tank 5. A second receiver or catch basin 28 is disposed immediately beneath the overflow basin 20 so that any leakage through the slot 22 may be entrapped and returned by the branch pipe 29 to the drainage pipe 21 leading to the source of supply of the filter tank 5.

The operation of the apparatus is as follows: A slurry S containing a pulp consisting of fibrous material and other necessary dilutants in the proportion of, say, from two to four percent of solids, is lead into the filter tank 5 through the pipe 34. As the drum 6 rotates in the direction of the arrow $a$ a filter cake 12 is built up on the peripheral surface of the drum 6. Due to the characteristics of the material, the cake 12 which is formed, is of such density that it is only of limited thickness and when dry the cake will not exceed $\frac{1}{4}$ inch in thickness. This is too thin to use for insulating sheet material. To increase the thickness of the cake, an additional layer 30 of filter cake is applied to that layer 12 formed on the peripheral surface of the drum 6. The continuous wire mesh screen 23 passing through the slot 22 in the filter tank 5 is utilized as a supplemental filtering medium. As the slurry S from the tank 5 flows through the cut-away part 19, because of the head of fluid L therein, into the overflow basin 20, which has the level L' of fluid therein, it must travel through the continuous mesh belt 23 which serves as a screen or filter so that an additional cake 30 is built up on that surface of the screen 23 toward the drum 6 and as the drum rotates and the screen 23 travels therewith the cake 30 is carried upwardly and applied to the filter cake already on the drum 6 and the cake 30 is pressed against the cake 12 by the combined action of the compression belt 17 and the continuous mesh belt 23 so that the finished cake as it passes beneath the compression belt is of a thickness such that when dried, it will have the thickness of say $\frac{1}{2}$ inch which is requisite for a sheet of insulating material. The continuous wire mesh belt 23 has an additional function of retaining the combined filter cake 12—30 on the drum 6 and preventing portions thereof from slipping back during compression and piling up and disrupting, so that the cake which is carried away from the drum by the reinforcing medium 10 is of a homogeneous structure.

The filter cake 12—30 is discharged from the reinforcement 10 by the discharge roller 11 and passes downwardly in the form of a continuous sheet of the desired width and necessary thickness into conditioning devices, such as are schematically illustrated at 32. Any particles of cake adhering to the strands 10 may be removed by means of the comb 33.

If desired the suction during the filtering period may be increased toward the latter part of the filtering zone as at the point indicated by the line $x$—$x$ in a manner and for a purpose which is well understood by those skilled in the art and in some circumstances advantageous results may be obtained thereby.

It will thus be seen that a method and apparatus has been provided whereby a sheet applicable for insulating purposes may be produced in a continuous process by the use, in part, of filtering devices and through the instrumentality of suction and utilizing as the material, a stock mixture which will not, under ordinary conditions, permit the building up of a filter cake of the requisite thickness.

Various modifications may be made in the configuration and composition of the component elements going to make up the apparatus as a whole as well as in the steps availed of in the method and no limitation is intended by the phraseology of the foregoing description or illustration in the accompanying drawings except as set forth in the appended claims.

What I claim is:

1. The method of manufacturing insulating sheet material comprising forming a filter cake, forming a deposit, applying the two together while retaining them against disruption, and thereafter simultaneously compressing and increasing the suction on one side thereof while retained together against disruption.

2. The method of manufacturing insulating sheet material comprising forming a filter cake, forming a deposit, applying the two together while retaining them against disruption, and thereafter simultaneously compressing and varying the atmospheric pressure on the respective sides thereof while retained together against disruption.

3. Apparatus for the manufacture of insulating sheet material comprising a filter tank, a filter drum rotating therein, said tank being formed with an overflow, a screen in the overflow and passing thru a portion of the tank, and means to apply deposit formed on the screen to the filter cake formed on the drum.

4. Apparatus for the manufacture of insulating sheet material comprising a filter tank, a filter drum for forming a filter cake, a continuous screen to form a deposit on the screen prior to its contact with the drum, means to maintain the screen and deposit in contact for a part of its length with the deposit on the drum to unite the deposit and cake, and means to apply a pressure to the screen after the deposit and cake have been united.

5. Apparatus for the manufacture of insulating sheet material comprising a filter tank, a filter drum rotating therein, said tank being formed with an overflow, a continuous screen adapted to travel across the overflow and to contact with the peripheral surface of the drum for a portion of its length thereafter and a compression belt adapted to engage the screen when in contact with the drum.

6. Apparatus for the manufacture of insulating sheet material comprising a filter tank formed with an overflow, a filter drum rotating therein, a cake reenforcement encircling the drum and spaced therefrom during a portion of its travel, a continuous screen adapted to travel across the overflow and to contact with the cake reenforcement for a portion of its travel about the drum subsequent to its travel across the overflow.

7. Apparatus for the manufacture of insulating sheet material comprising a filter tank, formed with an overflow, a filter drum rotating therein, a cake reenforcement encircling the drum and spaced therefrom during a portion of its travel, a continuous screen adapted to travel across the overflow and to contact with the cake reenforcement for a portion of its travel about the drum and subsequent to its travel across the overflow, and a compression belt adapted to compress the screen against the cake reenforcement.

8. Apparatus for the manufacture of insulating sheet material comprising a filter tank, formed with an overflow, a filter drum rotating therein, cake discharge means, a cake reenforcement comprising a plurality of continuous, spaced, independent strands encircling the drum and cake discharge means, a continuous screen adapted to travel across the overflow and into contact with the drum for a portion of its length and a compression belt adapted to compress the screen against the cake reenforcement on the drum.

9. Apparatus for the manufacture of insulating sheet material comprising a filter tank formed with an overflow, a filter drum rotating therein, cake discharge means, a cake reenforcement comprising a plurality of continuous, spaced, independent strands encircling the drum and cake discharge means, a continuous screen adapted to travel across the overflow and into contact with the drum for a portion of its length, a compression belt adapted to compress the screen against the drum, treating devices and means to conduct the cake thereto after it is discharged from the reenforcement.

10. Apparatus for the manufacture of insulating sheet material comprising a filter cut away at one end to form an overflow, a filter drum rotating therein, an overflow basin carried with the tank to receive the overflow, said tank being formed with a slot beneath the cut away portion, a continuous screen passing through the slot and in contact with the drum for a portion of its periphery, a catch basin beneath the slot and a compression belt adapted to contact with the screen where it travels with the drum.

11. Apparatus for the manufacture of insulating sheet material comprising a filter tank cut away at one end to form an overflow, a filter drum rotating therein having a drainage member on its peripheral surface and a wire screen thereover, an overflow basin carried with the tank to receive the overflow, said tank being formed with a slot beneath the cut away portion, a continuous wire mesh screen passing through the slot and in contact with the drum for a portion of its periphery, a catch basin beneath the slot and a compression belt adapted to contact with the screen where it travels with the drum.

12. Apparatus for the manufacture of insulating sheet material comprising a filter tank cut away at one end to form an overflow, a filter drum rotating therein, having a drainage member on its peripheral surface and a wire screen thereover, an overflow basin carried with the tank to receive the overflow, a frame carried with the tank, rollers carried with the frame, said tank being formed with a slot beneath the cut away portion, a continuous wire mesh screen travelling about said rollers and passing through the slot and in contact with the drum for a portion of its periphery, a catch basin beneath the slot and a compression belt travelling about said rollers adapted to contact with the screen where it travels with the drum.

13. Apparatus for the manufacture of insulating sheet material comprising a filter tank cut away at one end to form an overflow, a filter drum rotating therein having a drainage member on its peripheral surface and a wire screen thereover, cake discharge means, a continous cake reenforcement encircling the drum adjacent the screen thereon and the cake discharge means, an overflow basin carried with the tank to receive the overflow, a frame carried with the tank, rollers carried with the frame, said tank being formed with a slot beneath the cut away portion, a continuous wire mesh screen travelling about said rollers and passing through the slot and in contact with the drum for a portion of its periphery, a catch basin beneath the slot and a compression belt travelling about said rollers adapted to contact with the screen where it travels with the drum.

14. The method of manufacturing insulating sheet material comprising forming a filter cake, forming an additional deposit, applying the second formed deposit to the filter cake, maintaining said deposits against disruption, and compressing and dewatering the combined deposit simultaneously while maintained against disruption.

In testimony whereof I affix my signature.

FRANK W. YOUNG.

CERTIFICATE OF CORRECTION.

Patent No. 1,794,433. Granted March 3, 1931, to

FRANK W. YOUNG.

It is hereby certified that error appears in the printed specification of the above numbered patent requiring correction as follows: Page 2, line 65, strike out the article "a"; page 3, line 37, claim 4, after the word "screen" first occurrence, insert the word means; and that the said Letters Patent should be read with these corrections therein that the same may conform to the record of the case in the Patent Office.

Signed and sealed this 31st day of March, A. D. 1931.

M. J. Moore,
Acting Commissioner of Patents.

(Seal)